United States Patent
Hardy et al.

(10) Patent No.: US 6,219,420 B1
(45) Date of Patent: Apr. 17, 2001

(54) HIGH ASSURANCE ENCRYPTION SYSTEM AND METHOD

(75) Inventors: Douglas Allan Hardy; Steven Robert Tugenberg, both of Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/146,065

(22) Filed: Sep. 2, 1998

(51) Int. Cl.[7] .................................................. H04L 9/06
(52) U.S. Cl. .............................. 380/2; 713/189; 714/708; 380/269; 380/29; 380/37
(58) Field of Search ......................... 713/189; 714/708; 380/2, 37, 269, 216, 29

(56) References Cited

U.S. PATENT DOCUMENTS 4,061,997 * 12/1977 Niethammer et al. .
4,208,544 * 6/1980 Burke, Jr. .
5,365,591 * 11/1994 Carswell et al. .
5,432,848 * 7/1995 Butter et al. .

FOREIGN PATENT DOCUMENTS 0 237 805 * 9/1987 (EP) ..................................... 380/102

* cited by examiner

Primary Examiner—Gilberto Barron, Jr.
(74) Attorney, Agent, or Firm—Gregory J. Gorrie; Maurice J. Jones (57) ABSTRACT

A processor (22) of an encryption system (20) receives plain text (24) and operates an encryption algorithm to convert the plain text (24) to cipher text (26). A state monitor (30) confirms a conversion sequence within each of a plurality of conversion cycles performed by the encryption algorithm. The state monitor (30) produces a first enablement signal (38) when the conversion sequence is confirmed. An encryption activity monitor (34) determines a number of blocks of cipher text (24) that are not encrypted. The encryption activity monitor (34) produces a second enablement signal (42) when the number of unencrypted blocks of cipher text (26) is less than a predetermined failure threshold (86). A monitor gate (36) enables output of the cipher text (26) in response to the first and second enablement signals (38, 42).

20 Claims, 6 Drawing Sheets

HIGH ASSURANCE ENCRYPTION SYSTEM AND METHOD

FIELD OF THE INVENTION

The present invention relates generally to encryption systems and, in particular, to encryption systems implemented in software.

BACKGROUND OF THE INVENTION

An encryption system is a security device that converts data into a disguised or encrypted form to render it unintelligible to anyone without a decryption key. Its intended purpose is to ensure privacy by keeping the information hidden from anyone for whom it is not intended. Many techniques and algorithms are known for the conversion of the original data, referred to herein as plain text, into its encrypted form, referred to herein as cipher text.

In a simple encryption system, for example, the sender and the recipient hold identical copies of a secret key, and also an algorithm with which they each generate identical pseudorandom bit sequences. During encryption, the sender modifies the plain text by combining it with the pseudorandom sequence to produce the cipher text. The cipher text is then transmitted. The recipient performs the reverse process by subtracting an identical pseudorandom sequence from the received cipher text to recover the plain text.

An alternative encryption technique is the use of a simple codebook system where the sender and the recipient hold copies of a secret substitution table. The table lists the codes to be transmitted as the cipher text, depending on the value of each byte of the plain text. Practical codebook schemes normally use substitution codes corresponding to longer blocks of plain text, typically sixty-four bits. In such schemes, the substitution codes are generated algorithmically by the sender and recipient since the size of the substitution table usually precludes its explicit storage.

Encryption systems are conventionally implemented in a combination of software algorithms and custom encryption hardware that contains redundant encryption functions. The redundant encryption functions of the custom encryption hardware include operational checks that ensure that the plain text is being effectively encrypted. Unfortunately, some communication equipment, such as commercial portable cellular handsets, cannot implement the custom encryption hardware for security due to size and power constraints.

To avoid the problems associated with custom encryption hardware, some encryption systems are implemented entirely in software algorithms programmed into conventional microprocessor systems. These software encryption algorithms can then be programmed into memory of the existing communication equipment, thereby overcoming the size and power constraints. However, encryption systems implemented in software have traditionally been perceived to be less secure than hardware implementations because software encryption algorithms can become modified or corrupted. Moreover, software encryption algorithms generally do not contain the same operational checks as algorithms implemented in the custom encryption hardware. Thus, it is difficult to ensure that the correct software encryption algorithms are being properly executed.

In addition, it is difficult to verify that the prior art software encryption algorithms are operating in real time, especially in multitasking environments. The term "real time" refers to the ability of the encryption system to output cipher text at substantially the same rate as the plain text is being input into the system. In multitasking systems, the encryption activities may have a lower processing priority than other activities, such as error checking, system housekeeping, and so forth. Accordingly, the conversion of plain text to cipher text may not occur within the time constraints of the system, leading to the output of unencrypted plain text. Moreover, conventional software encryption algorithms are unable to detect any discrepancy and inform the sender. This is an undesirable situation for maintaining security of communications between transmitting and receiving systems.

Accordingly, what is needed is a system and a method for encrypting plain text to produce cipher text which provide a high level of assurance that encryption is being properly executed. In addition, what is needed is a system and a method that incorporate high assurance software encryption algorithms into existing communications systems, such as commercial portable cellular handsets. Furthermore, a system and method is needed that can be incorporated into communications systems that have size, power, and bill-of-material constraints.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
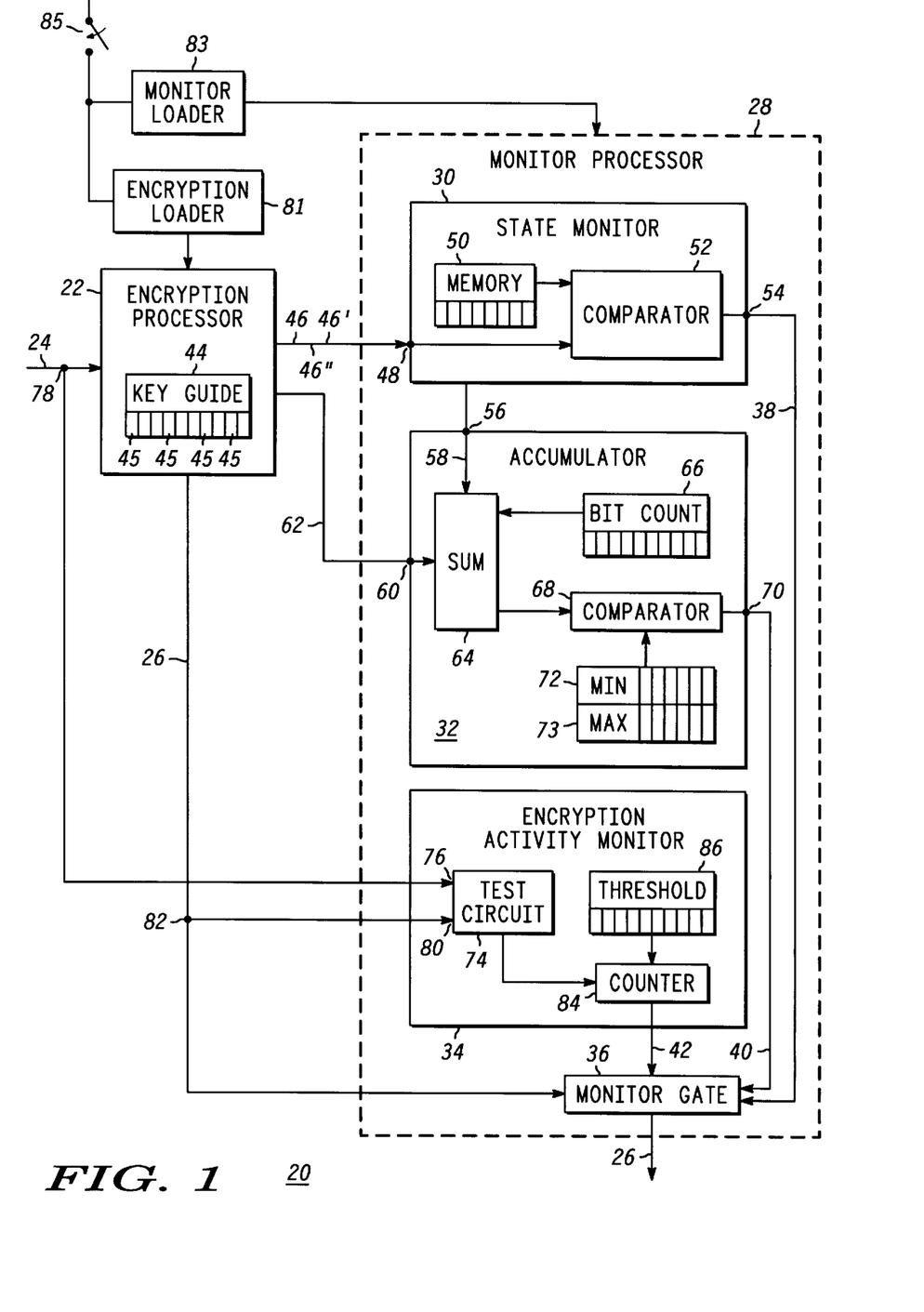
FIG. 1 shows a block diagram of an encryption system in accordance with a preferred embodiment of the present invention.

FIG. 1 shows a block diagram of an encryption system 20 in accordance with a preferred embodiment of the present invention. Encryption system 20 includes an encryption processor 22 for receiving and encrypting plain text 24 to produce cipher text 26. Plain text 24 is a digitized voice or data signal and cipher text 26 is a encrypted digital signal representative of plain text 24. System 20 also includes a monitor processor 28 in communication with encryption processor 22. Monitor processor 28 is configured to monitor an encryption algorithm implemented by encryption processor 22 to ensure that the encryption functions are being executed properly.

In the preferred embodiment, the software algorithms of encryption processor 22 and monitor processor 28 are implemented on a single processor chip (not shown) of a conventional communication unit (not shown), such as a commercial portable cellular handset. In an alternate embodiment, monitor processor 28 may be implemented in a programmable logic array in communications units where size, power, and bill-of-material constraints are less critical. In still another embodiment, encryption processor 22 is implemented and executed in one processor chip, while monitor processor 28 is implemented and executed in another processor chip. The two processors may perform additional tasks, such as transceiver control for one processor chip and I/O control for the other processor chip.

Monitor processor 28 includes a state monitor 30, an accumulator 32, and an encryption activity monitor 34, all of which are in communication with encryption processor 22. In addition, monitor processor 28 includes a monitor gate 36 coupled to encryption processor 22 and configured to enable output of cipher text 26 in response to a first enablement signal 38, a second enablement signal 40, and a third enablement signal 42 from state monitor 30, accumulator 32, and encryption activity monitor 34, respectively.

Encryption processor 22 includes a memory element (KEY GUIDE) 44, configured to store one or more encryption algorithms 45. Software encryption algorithms 45 may be Data Encryption Standard (DES), IDEA, or any other government or proprietary algorithm implemented in software.

In the preferred embodiment, each of encryption algorithms 45 are configured to generate a unique set of state vectors 46 at various points throughout the execution of the selected encryption algorithm 45. As a minimum, state vectors 46 include an initial state vector 46' and a final state vector 46". In an alternate embodiment, additional interim state vectors are also output. State vectors 46 are used to inform state monitor 30 that specific sections of a selected software encryption algorithm have been executed. State vectors 46 will be discussed in greater detail below.

State monitor 30 is a programmable state machine in which predetermined state vectors describing a predetermined conversion sequence of a selected one of encryption algorithms 45 are programmed into a memory element 50. State monitor 30 is desirably implemented as a linear feedback shift register where predetermined initial and final state vectors are programmed and any of the interim state vectors are LFSR states between the initial and final state vectors. State monitor 30 includes an input 48 coupled to encryption processor 22 for receiving state vectors 46. A comparator 52 of state monitor 30 compares state vectors 46 with the predetermined state vectors from memory element 50, and an output 54 produces first enablement signal 38 in response to the comparison.

Accumulator 32 includes a first input 56 configured to receive a conversion cycle-end signal 58 from state monitor 30. In addition, accumulator 32 has a second input 60 for receiving cipher text timing marks 62 being output from encryption processor 22. A cipher text timing mark 62 is generated by encryption processor 22 at each instance of conversion of a bit of plain text 24 by encryption processor 22, and will be discussed in greater detail below.

A summing circuit (SUM) 64 of accumulator 32 is coupled to first and second inputs 56 and 60 of accumulator 32, and to a bit count memory element (BIT COUNT) 66. Summing circuit 64 maintains a bit balance value, and is configured to add the bit count from memory element 66 to the bit balance value following receipt of conversion cycle-end signal 58. In addition, summing circuit 64 decrements the bit balance value following receipt of each of cipher text timing marks 62. A comparator 68 is coupled to summing circuit 64 and outputs second enablement signal 40 from an accumulator output 70 in response to a comparison of the bit balance to a minimum bit threshold value (MIN) 72 and a maximum bit threshold value (MAX) 73.

Encryption activity monitor 34 includes a test circuit 74 having a first input 76 for receiving blocks of plain text 24, and a second input 80 for receiving blocks of cipher text 26. An intersect 78 provides access to the plain text data stream 24, and an intersect 82 provides access to the cipher text data stream 26. Test circuit 74 identifies the blocks of cipher text 26 that are equivalent to corresponding blocks of plain text 24. A counter 84 is coupled to test circuit 74 for counting the identified blocks of cipher text 26, and is configured to produce third enablement signal 42 when the count is less than a predetermined failure threshold 86.

System 20 further includes an encryption loader 81 and a monitor loader 83. Encryption loader 81 and a monitor loader 83 contain independent setup algorithms configured such that encryption loader 81 initializes encryption processor 22 and monitor loader 83 initializes monitor processor 28. The setup algorithms are accessed in response to an encryption selection signal detectable by the closure of a switch 85. The encryption selection signal may be a particular electronic code and switch 85 may be a logical switch that when activated causes each setup algorithm to begin execution.

Encryption loader 81 initializes encryption processor 22 when the setup algorithm activates one of encryption algorithms 45 from key guide memory element 44. Likewise, monitor loader 83 initializes memory element 50, bit count memory element 66, bit threshold values 72 and 73, and predetermined failure threshold 86 in response to the selected one of encryption algorithms 45. Encryption loader 81 and monitor loader 83 function independently of one another to reduce the likelihood of a failure in a single setup algorithm corrupting the functions of both encryption processor 22 and monitor processor 28.

Figure 2:
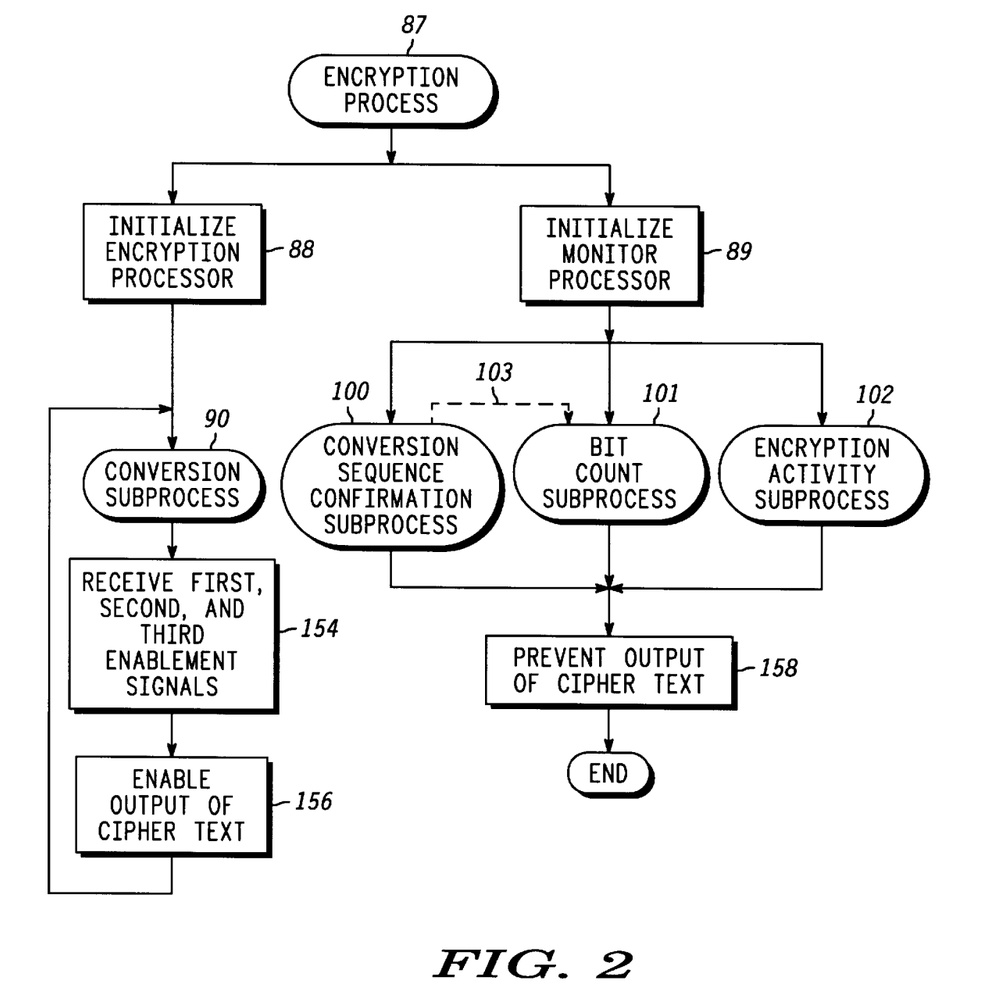
FIG. 2 shows a flow chart of an encryption process performed by the encryption system in accordance with a preferred embodiment of the present invention.

FIG. 2 shows a flow chart of an encryption process 87 performed by encryption system 20 in accordance with a preferred embodiment of the present invention. Encryption process 87 is initiated by a user of a communications unit, such as a commercial portable cellular handset. Process 87 may be initiated when a sender places a call, a recipient answers the call, and the sender or recipient subsequently enters a code into the communication device to "go secure". In other words, the "go secure" signal causes, at least logically, the "closure" of switch 85 (FIG. 1) to activate encryption system 20.

A particular one of encryption algorithms 45 is selected in a message exchange between the sender and the recipient during the transition to secure mode. Alternatively, the code to "go secure" may be the encryption selection signal that also selects a particular one of encryption algorithms 45 stored in key guide memory element 44 (FIG. 1).

Process 87 begins with parallel tasks 88 and 89. Tasks 88 and 89 are illustrated in FIG. 2 as being parallel because they are independent of one another, desirably use separate programming code without common components, have substantially no influence over one another, and may be performed in any order. Task 88 causes encryption loader 81 (FIG. 1) to initialize encryption processor 22 (FIG. 1). For example, a first setup routine in a memory portion of encryption loader 81 initializes encryption processor 22 with a selected one of encryption algorithms 45 from key guide memory 44.

Task 89 causes monitor loader 83 (FIG. 1) to initialize monitor processor 28 (FIG. 1). A second setup routine in a monitor loader 83 loads the threshold parameters specific to the selected one of encryption algorithms 45 into monitor processor 28. The threshold parameters include the predetermined state vectors loaded into memory 50 (FIG. 1) of state monitor 30 (FIG. 1). In addition, the bit balance of accumulator 32 (FIG. 1) is initialized to zero. Accumulator 32 is initialized with the bit count value for bit count memory element 66 (FIG. 1) and bit threshold values 72 and 73 (FIG. 1). Encryption activity monitor 34 (FIG. 1) is initialized with predetermined failure threshold 86 (FIG. 1).

In an alternate embodiment, independent setup routines may be utilized for independent initialization of each of state monitor 30, accumulator 32, and encryption activity monitor 34. Independent setup routines of tasks 88 and 89 reduce the likelihood of a corruption in a single setup routine causing encryption system 20 to fail to produce cipher text 26 (FIG. 1). Thus, the independent setup routines increase the reliability of encryption system 20.

In addition to initialization of monitor processor 28, task 89 causes encryption system 20 to initiate self-tests in order to ensure that each of state monitor 30, accumulator 32, and encryption activity monitor 34 operates properly. The self-tests ensure that each of state monitor 30, accumulator 32, and encryption activity monitor 34 detects the type of error for which it is configured to detect. Monitor gate 36 (FIG. 1) is also tested to ensure that it will properly function to prevent the output of cipher text 26 if any of state monitor 30, accumulator 32, and encryption activity monitor 34 detects an error.

Figure 3:
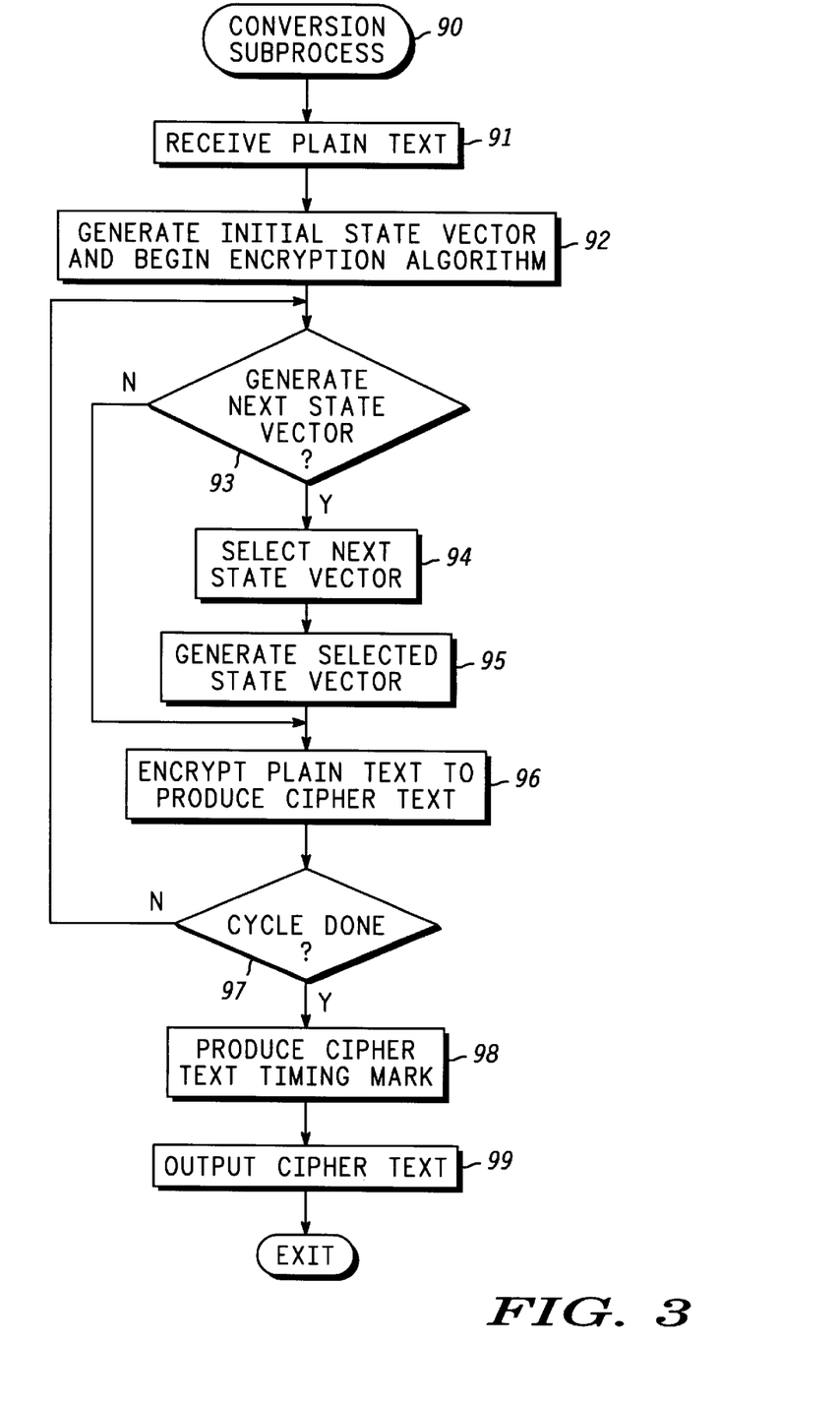
FIG. 3 shows a flow chart of a conversion subprocess of the encryption process in accordance with a preferred embodiment of the present invention.

Following independent initialization task 88, a conversion subprocess 90 causes encryption processor 22 (FIG. 1) to convert plain text 24 (FIG. 1) to cipher text 26 (FIG. 1). FIG. 3 shows a flow chart of conversion subprocess 90 of the encryption process 87 in accordance with a preferred embodiment of the present invention. Conversion subprocess 90 illustrates an exemplary conversion cycle performed by encryption processor 22 in response to the selected one of encryption algorithms 45 (FIG. 1).

Subprocess 90 is performed for each "block" of plain text 24 to be encrypted. In the exemplary embodiment, each "block" of plain text 24 includes only a single bit of plain text data. However, those skilled in the art will recognize that a block of plain text 24 may include any number of bits of plain text 24 conventionally processed during a single conversion cycle of conversion subprocess 90 by the selected one of encryption algorithms 45 (FIG. 1).

Conversion subprocess 90 begins with a task 91. Task 91 causes encryption processor 22 (FIG. 1) to receive a bit of plain text 24 (FIG. 1). In response to receipt of a bit of plain text 24 in task 91, a task 92 is performed.

Task 92 causes the selected one of encryption algorithms 45 operating in encryption processor 22 to generate initial state vector 46' (FIG. 1). Initial state vector 46' marks the beginning of a conversion sequence of a single conversion cycle performed by the selected one of encryption algorithms 45 (FIG. 1). In addition, task 92 causes the selected one of encryption algorithms 45 to begin the conversion cycle.

In response to task 92, a query task 93 determines whether a point in the conversion cycle has been reached where another one of state vectors 46 is to be generated. As discussed above, the next one of state vectors 46 may be generated at the end of a conversion cycle, or interim state vectors may be generated at intermediate stages of each conversion cycle. For example, a state vector may be generated following each subtask (not shown) occurring within the conversion cycle.

When task 93 determines that another state vector 46 is to be generated, a task 94 selects the next one of state vectors 46 from a predetermined sequence of state vectors. Desirably, each state vector 46 represents a number, and the sequence of numbers output as state vectors is pseudorandom. Accordingly, task 94 may select the next state vector from a table of state vectors or may perform an algorithm which generates the next state vector in the predetermined sequence.

Following task 94, a task 95 causes encryption processor 22 to generate the state vector 46 selected above in task 94 by making the selected state vector 46 available to state monitor 30 of monitor processor 28. After task 95 and when query task 93 determines that no state vector needs to be generated, a task 96 is performed.

Task 96 causes encryption processor 22 to encrypt the bit of plain text 24 received in task 91 to produce cipher text 26 by utilizing the particular encryption codes or keys determined by the selected one of encryption algorithms 45. Those skilled in the art will recognize that the encryption activities of task 96 may be broken down into several subtasks representing intermediate steps within an encryption sequence.

Following task 96, a query task 97 determines if the conversion cycle is complete. The conversion cycle is complete at a point in the encryption algorithm when all of the encryption subtasks of task 96 (not shown) have been performed in the process of encrypting plain text 24 to produce cipher text 26 and when final state vector 46" has been generated in task 95. Those skilled in the art will appreciate that different encryption algorithms have different cycle characteristics which are determined by the nature of the encryption algorithm. When the conversion cycle is not complete in query task 97, subprocess 90 loops back to task 93 to continue generating state vectors at appropriate points within the current conversion cycle and to continue the intermediate encryption subtasks of task 96.

When the cycle has ended in query task 97, subprocess 90 proceeds to a task 98. Task 98 causes encryption processor 22 to produce one of cipher text timing marks 62. Thus, cipher text timing mark 62 marks an instance of conversion of a bit of plain text 24 to cipher text 26 by encryption processor 22.

Following task 98, a task 99 causes encryption processor 22 to output cipher text 26. Following task 99, subprocess 90 is complete for one conversion cycle and subprocess 90 exits. However, subprocess 90 may be immediately reinitiated to begin another conversion cycle for a subsequent bit, or block, of plain text 24. During the next conversion cycle, the sequence of state vectors generated by subprocess 90 will again begin with initial state vector 46'.

With reference back to encryption process 87 (FIG. 2), following initialization task 89, a conversion sequence confirmation subprocess 100, a bit count subprocess 101, and an encryption activity subprocess 102 are performed independently from conversion subprocess 90. Subprocesses 100, 101, and 102 are background operations that operate in parallel with conversion subprocess 90 to verify the proper execution of the encryption algorithm 45 used by encryption processor 22. Accordingly, although subprocesses 100, 101, and 102 operate independently of conversion subprocess 90, the combined activities occurring in subprocesses 90, 100, 101, and 102 result in the output of cipher text 26 in encryption process 87. A dashed line 103 serves to illustrate a dependent relationship between conversion sequence confirmation subprocess 100 and bit count subprocess 101, which will be described in detail below.

Figure 4:
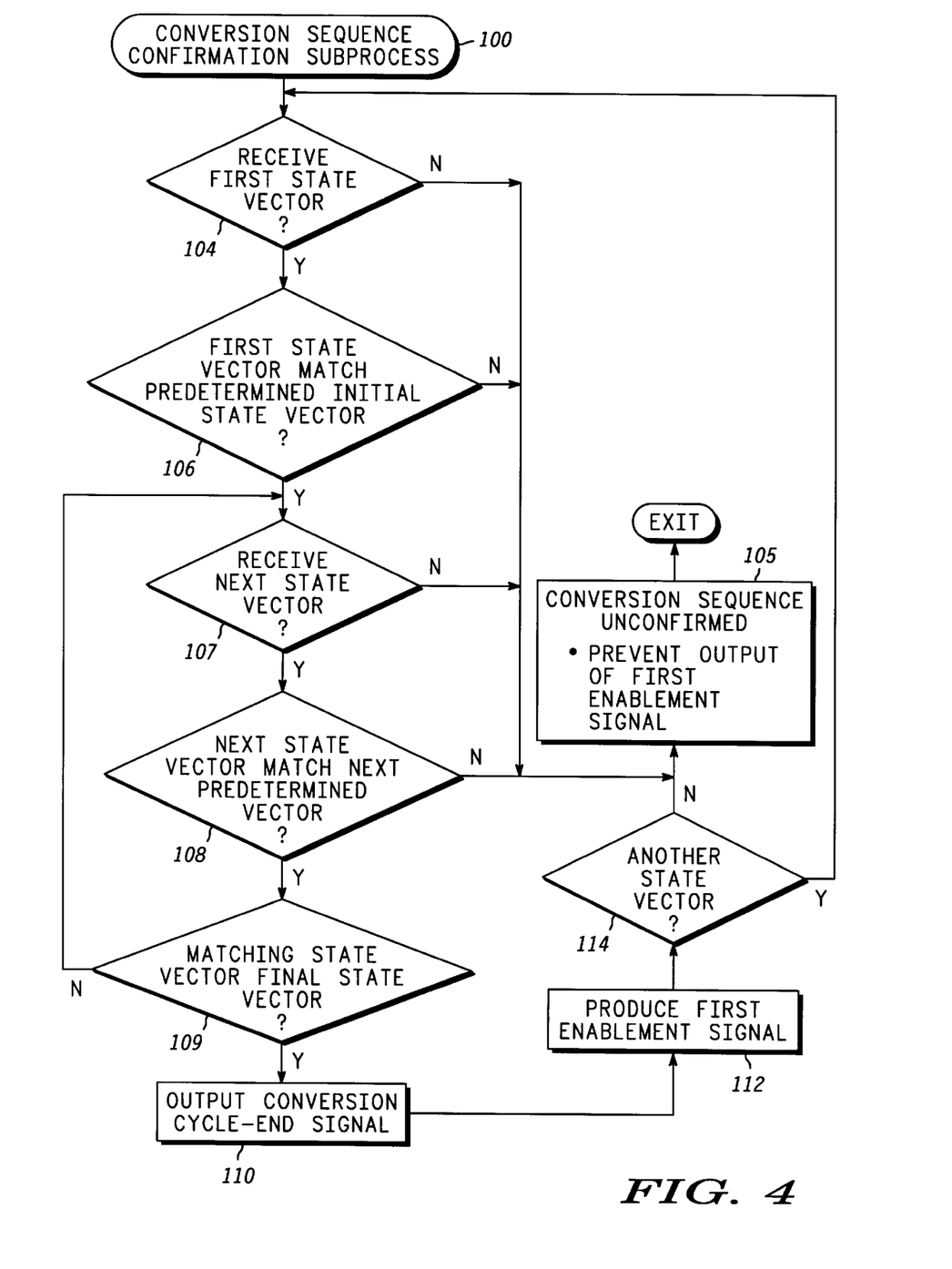
FIG. 4 shows a flow chart of a conversion sequence confirmation subprocess of the encryption process in accordance with a preferred embodiment of the present invention.

FIG. 4 shows a flow chart of conversion sequence confirmation subprocess 100 of encryption process 87 in accordance with a preferred embodiment of the present invention. Conversion sequence confirmation subprocess 100 is performed by state monitor 30 (FIG. 1) to ensure that the encryption algorithm encrypting plain test 24 (FIG. 1) in encryption processor 22 (FIG. 1) performs the proper functions in the proper order. In other words, conversion sequence confirmation subprocess 100 ensures that the selected one of encryption algorithms 45 starts in the initial state, performs interim states in the correct order, and ends in the final state for each of a plurality of conversion cycles.

Subprocess 100 begins with a query task 104. Query task 104 determines if state monitor 30 (FIG. 1) has received first state vector 46' (FIG. 1), indicating the initial state of a conversion sequence of the selected encryption algorithm encrypting plain text 24. When first state vector 46' is not received, subprocess 100 proceeds to a task 105 (discussed below). When first state vector 46' is received, subprocess 100 proceeds to a query task 106.

Query task 106 causes comparator 52 (FIG. 1) of state monitor 30 to determine if first state vector 46' matches the predetermined initial state vector in memory element 50. When first state vector 46' does not match the predetermined initial state vector in memory element 50, subprocess 100 proceeds to task 105 (discussed below). When first state vector 46' does match the predetermined initial state, subprocess 100 proceeds to a query task 107.

Query task 107 determines if state monitor 30 (FIG. 1) has received another one of state vectors 46 (FIG. 1). When another one of state vectors 46 is not received, subprocess 100 proceeds to task 105 (discussed below). When another one of state vectors 46 is received, subprocess 100 proceeds to a query task 108.

Query task 108 determines if the received state vector 46 from query task 107 matches the next predetermined state vector in memory element 50 (FIG. 1) indicating the next predetermined state in the conversion sequence of the selected encryption algorithm encrypting plain text 24. When the received state vector 46 does not match the next predetermined state vector, subprocess 100 proceeds to task 105 (discussed below). When 108 determines a match, subprocess proceeds to a query task 109.

Query task 109 determines if the matching state vector 46 from query task 108 is final state vector 46", indicating the final state in the conversion sequence of the selected encryption algorithm encrypting plain text 24. When the matching state vector is not final state vector 46", subprocess 100 loops back to query task 107 to await receipt and analysis of another state vector. However, when final state vector 46" is received, the conversion cycle is complete and subprocess 100 proceeds to a task 110. Thus, query task 109 differentiates between the receipt of final state vector 46" and interim state vectors being generated for the intermediate steps being performed during a conversion cycle, as discussed in connection with task 96 (FIG. 3).

Task 110 causes state monitor 30 to output conversion cycle-end signal 58, indicating the end of the conversion cycle described in conversion subprocess 90. In connection with task 110, a task 112 causes state monitor 30 to produce first enablement signal 38 (FIG. 1) to indicate that the conversion cycle performed in subprocess 90 (FIG. 3) is being executed in the correct order.

Following task 112, a query task 114 determines if another one of state vectors 46 is detected by state monitor 30. When another one of state vectors 46 is detected, program control loops back to query task 104 to begin confirmation of the next conversion sequence. Subprocess 100 remains in this loop until no further state vectors 46 are received, signifying no more plain text 24 is being encrypted or until an error in the conversion sequence is detected. While subprocess 100 is in this loop, first enablement signal 38 is output by state monitor 30.

However, when state monitor 30 does not detect another one of state vectors 46 in query task 114, or when any one of query tasks 104, 106, 107, 108, or 109 are negative, program control proceeds to task 105. Task 105 determines that the conversion sequence for that conversion cycle is unconfirmed. An unconfirmed conversion cycle causes state monitor 30 (FIG. 1) to prevent output of first enablement signal 38. The conversion sequence may be unconfirmed because the software encryption algorithm is corrupted. When the software encryption algorithm is corrupted, initial and final vectors 46' and 46", respectively, and any interim vectors, are not output by encryption processor 22 at all or not output in the correct order. Alternatively, when the communication session is complete, first state vector 46' is not produced by encryption processor 22, thus the conversion sequence is unconfirmed, and the output of first enablement signal 38 is prevented. Following task 105, encryption system 20 exits subprocess 100 with first enablement signal 38 disabled.

Figure 5:
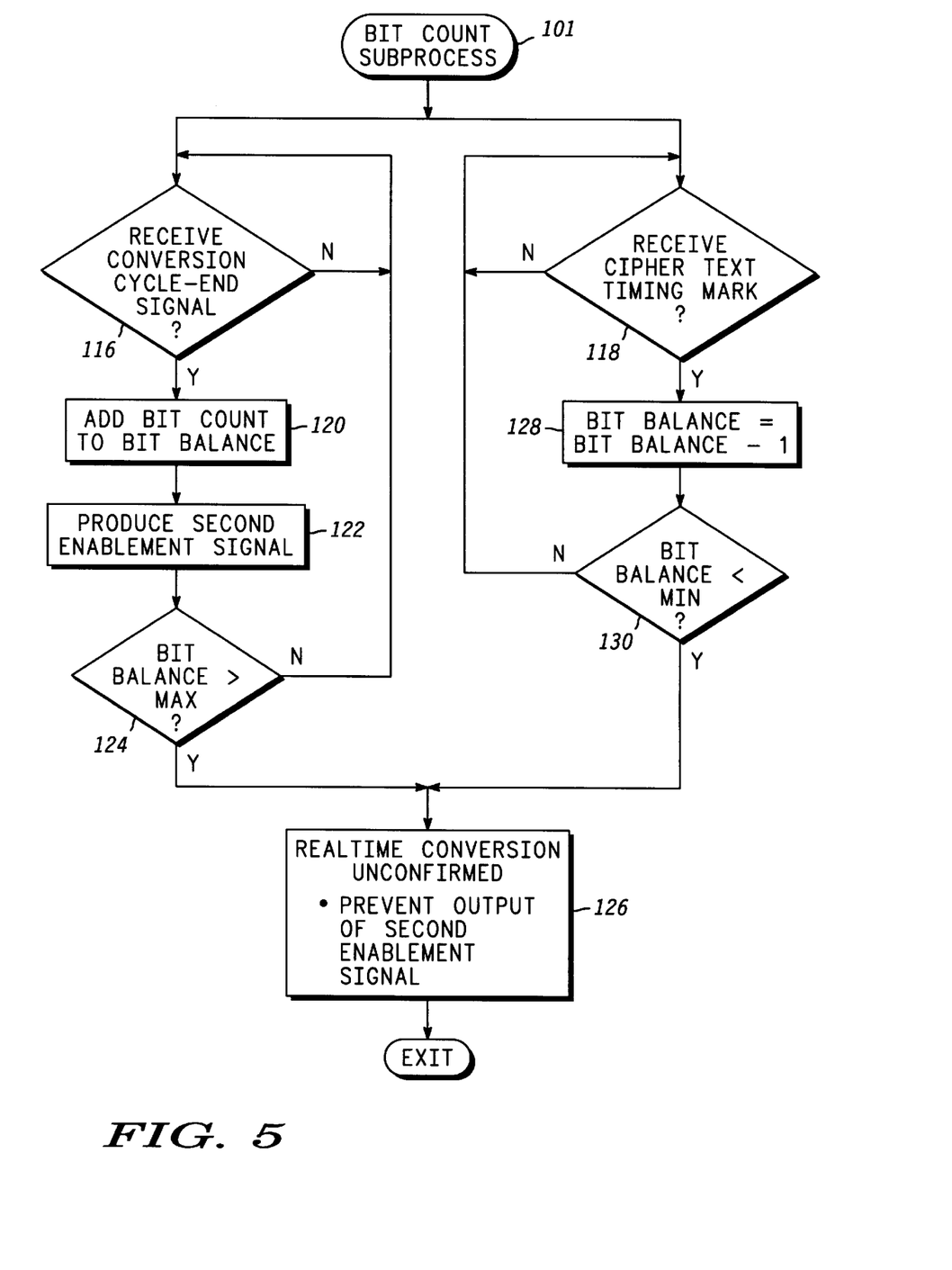
FIG. 5 shows a flow chart of a bit count subprocess of the encryption process in accordance with a preferred embodiment of the present invention.

FIG. 5 shows a flow chart of bit count subprocess 101 of encryption process 87 (FIG. 2) in accordance with a preferred embodiment of the present invention. Bit count subprocess 101 is performed by accumulator 32 (FIG. 1) to ensure that the selected one of encryption algorithms 45 which is encrypting plain text 24 (FIG. 1) in encryption processor 22 (FIG. 1) is operating in real time. In other words, bit count subprocess 101 ensures that cipher text 26 (FIG. 1) is output from encryption processor 22 at approximately the same rate at which plain text 24 is being converted by encryption processor 22.

Bit count subprocess 101 begins with parallel query tasks 116 and 118. Query task 116 and its subsequent tasks (described below) describe an addition leg of subprocess 101, which is utilized to increase the bit balance value maintained in summing circuit 64 (FIG. 1). Query task 118 and its subsequent tasks (described below) describe a subtraction leg of subprocess 101, which is utilized to decrease the bit balance value maintained in summing circuit 64.

Query task 116 determines if accumulator 32 has received conversion cycle-end signal 58 (FIG. 1) from state monitor 30 (FIG. 1). As described in connection with task 110 (FIG. 4), state monitor 30 produces conversion cycle-end signal 58 following the completion of a conversion cycle. Thus, in order to initiate bit count subprocess 101, accumulator 32 depends upon the functions of subprocess 100, as illustrated by dashed line 103 (FIG. 2). In addition, since subprocess 101 awaits conversion cycle-end signal 58, subprocess 101 lags conversion sequence confirmation subprocess 100 by at least one conversion cycle.

When query task 116 determines that no conversion cycle-end signal 58 has been received, program control loops back to an input flow of query task 116 to await eventual receipt of conversion cycle-end signal 58 without changing the bit balance value maintained in summing circuit 64.

When conversion cycle-end signal 58 (FIG. 1) is received in query task 116, a task 120 is performed. Task 120 causes summing circuit 64 (FIG. 1) of accumulator 32 to add the bit count stored in bit count memory element 66 (FIG. 1) to the bit balance. The bit count in bit count memory element 66 is a value that describes the number of bits of plain text 24 (FIG. 1) that are to be encrypted in a single conversion cycle. As described in initialization task 89 (FIG. 2), the bit balance is initialized to zero prior to the encryption operations of encryption process 87 (FIG. 2). Thus, the bit balance begins with a positive value corresponding to the bit count, or number of bits to be encrypted.

Following task 120, a task 122 is performed. Task 122 causes accumulator 32 (FIG. 1) to produce second enablement signal 40 (FIG. 1).

In response to tasks 120 and 122, a query task 124 is performed. Query task 124 causes comparator 68 (FIG. 1) to determine if the bit balance value modified by summing circuit 64 (FIG. 1) in task 120 is greater than maximum bit threshold value 73 (FIG. 1). A bit balance value greater than maximum bit threshold value 73 indicates a buffer overflow problem in cipher text output buffers (not shown) of encryption processor 22 (FIG. 1). In other words, the encryption algorithm 45 could be corrupted or otherwise malfunctioning such that cipher text 26 is produced by encryption processor 22, but not output by processor 22.

When query task 124 determines that the bit balance value is not greater than maximum bit threshold value 73, program control loops back to query task 116 for eventual receipt of another conversion cycle-end signal. Accordingly, second enablement signal 40 continues to be produced.

When the bit balance value is greater than maximum bit threshold value 73 in query task 124, program control proceeds to a task 126 (described below).

Referring back to query task 118 of bit count subprocess 101, query task 118 determines if cipher text timing mark 62 is received. Query task 118 causes accumulator 32 (FIG. 1) to determine if cipher text timing mark 62 is being produced by encryption processor 22 as plain text 24 is converted to cipher text 26 (FIG. 1) in conversion subprocess 90 (FIG. 3). As described in connection with task 98 (FIG. 3) of conversion subprocess 90, each time a conversion cycle is complete and a bit of plain text 24 (FIG. 1) is converted to cipher text, cipher text timing mark 62 is produced by encryption processor 22 for subsequent detection by accumulator 32.

When accumulator 32 does not receive cipher text timing mark 62, program control loops back to an input flow side of query task 118 to await eventual receipt of cipher text timing mark 62.

In response to receipt of cipher text timing mark 62 in query task 118, a task 128 is performed. Task 128 causes summing circuit 64 (FIG. 1) of accumulator 32 to decrement the bit balance value maintained in summing circuit 64 by a value of one.

Following task 128, a query task 130 determines if the bit balance is less than minimum bit threshold value 72 (FIG. 1). In the preferred embodiment, minimum bit threshold value 72 is a value of zero. Accordingly, query task 130 causes comparator 68 (FIG. 1) of accumulator 32 to compare the bit balance to a bit threshold value 72 of zero.

When the bit balance is not less than minimum bit threshold value 72 in query task 130, subprocess 101 loops back to query task 118 to await eventual receipt of another cipher text timing mark 62. However, when the bit balance is less than minimum bit threshold value 72, subprocess 101 proceeds to task 126.

In response to the bit balance value being greater than maximum bit threshold value 73 in query task 124, or in response to the bit balance value being less than minimum bit threshold value 72 in query task 130, task 126 ascertains that real time conversion of plain text 24 to cipher text 26 is unconfirmed. In other words, encryption processor 22 (FIG. 1) is producing bits of cipher text 26 at a rate which is inconsistent with the rate at which cipher text 26 is being output by encryption processor 22. Alternatively, communication may be complete, hence conversion cycle-end signal 58 is not received in query task 116. In either instance, task 126 causes accumulator 32 to prevent output of second enablement signal 40 (FIG. 1), and encryption system 20 exits subprocess 101 with second enablement signal 40 disabled.

When both of query tasks 124 and 130 are negative, encryption processor 22 is producing bits of cipher text 26 at a rate consistent with the rate at which cipher text 26 is being output by encryption processor 22. In other words, encryption processor 22 is operating in real time. Real time operation is verified when the bit balance value maintained in summing circuit 64 (FIG. 1) is within upper and lower limits described by minimum and maximum bit thresholds 72 and 73, respectively. The verification of real time operation is important when encryption processor 22 is operating in a multi-tasking environment. In a multi-tasking environment, encryption processor 22 may become utilized to perform tasks having a higher priority than encryption. Thus, plain text 24 may not be encrypted and the security of the communications may be compromised.

Figure 6:
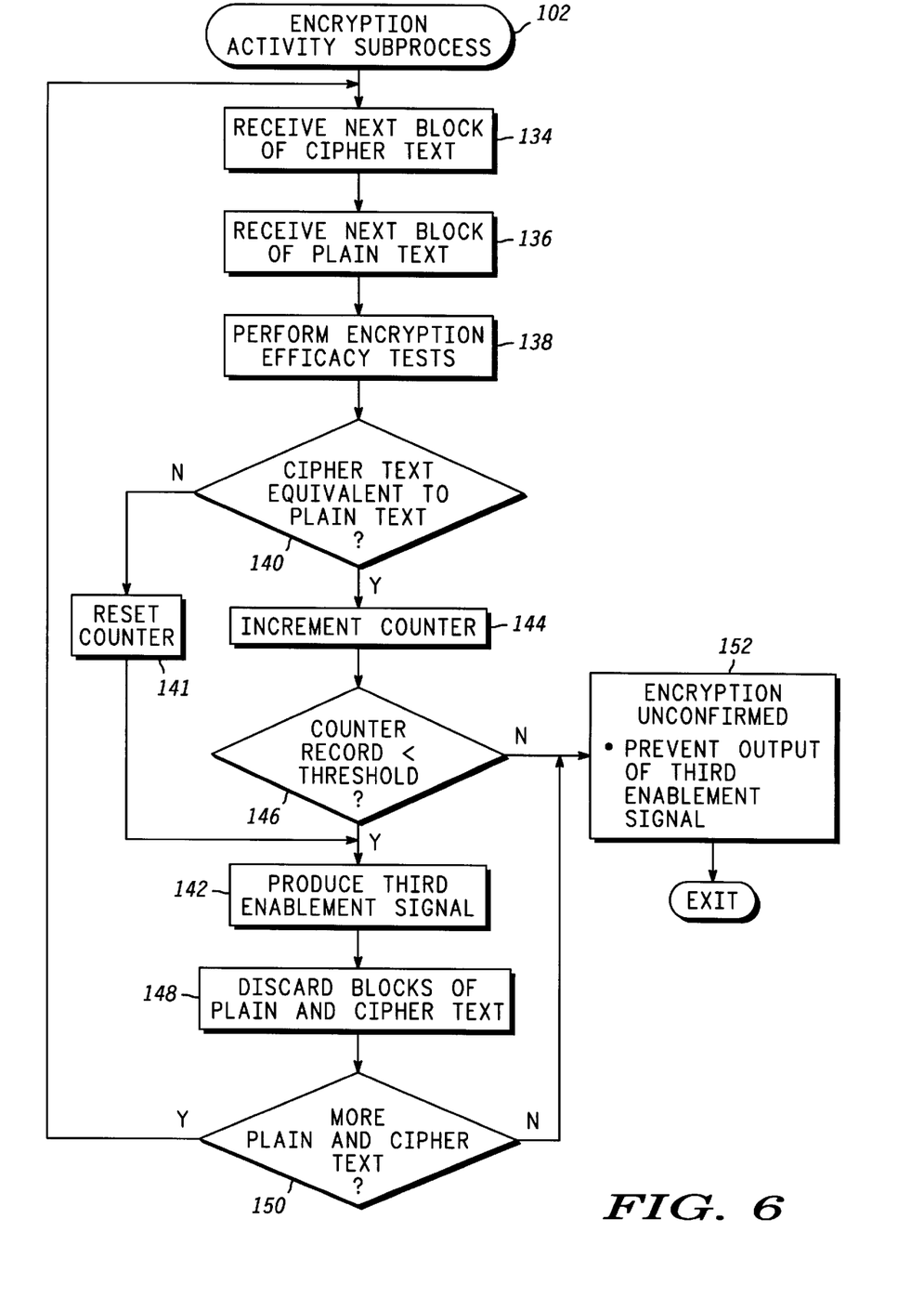
FIG. 6 shows a flow chart of an encryption activity subprocess of the encryption process in accordance with a preferred embodiment of the present invention.

FIG. 6 shows a flow chart of encryption activity subprocess 102 of encryption process 87 in accordance with a preferred embodiment of the present invention. Encryption activity subprocess 102 is performed by encryption activity monitor 34 (FIG. 1) to verify that the selected one of encryption algorithms 45 (FIG. 1) operating in encryption processor 22 (FIG. 1) is effectively encrypting plain text 24 (FIG. 1).

Subprocess 102 begins with a task 134 which causes encryption activity monitor 34 to receive a block of cipher text 26 at second input 80 (FIG. 1) of test circuit 74 (FIG. 1). In connection with task 134, a task 136 causes encryption activity monitor 34 to receive a corresponding block of plain text 24 at first input 76 (FIG. 1) of test circuit 74. The block size may correspond to the block size of plain text 24 encrypted during a single conversion cycle of conversion subprocess 90. In the exemplary embodiment, the block size is one bit. Alternatively, each block of cipher and plain text 26 and 24, respectively, may include a large number of bits of text. The block size depends upon the types of tests used to verify the efficacy of the selected one of encryption algorithms 45 operating in encryption processor 22 (FIG. 1).

In response to tasks 134 and 136, a task 138 is performed by test circuit 74 of encryption activity monitor 34. Task 138 causes test circuit 74 to perform several encryption efficacy tests on cipher text 26. By way of example, test circuit 74 first compares the block of cipher text 26 to the block of plain text 24 to determine if the block of cipher text 26 and the block of plain text 24 are the same. The block of cipher text 26 is then checked against the bit inverse of the block of plain text. In addition, the block of cipher text 26 is then checked against a bit shifted version of the block of plain text 24. Those skilled in the art will recognize that there are other encryption efficacy tests that may be implemented to verify that cipher text 26 is in fact significantly different from plain text 24. These alternate encryption efficacy tests are known to those skilled in the art, and will not be described in detail herein.

In response to task 138, a query task 140 determines if the block of cipher text 26 is equivalent to the block of plain text 24. Encryption processor 22 (FIG. 1) changes some of the plain text 24, while some of plain text 24 is not inverted. Thus, task 140 of subprocess 102 identifies those blocks of cipher text 26 that are equivalent to the corresponding blocks of plain text 24. In other words, task 140 identifies those blocks, or bits, of cipher text 26 that failed any one of the encryption efficacy tests of task 138.

When query task 140 determines that the block of cipher text is not equivalent to the block of plain text 24, subprocess 102 proceeds to a task 141. Task 141 causes encryption activity monitor 34 to reset counter 84 (FIG. 1).

Following task 141, subprocess 102 proceeds to a task 142. Task 142 causes encryption activity monitor 34 to produce third enablement signal 42 (FIG. 1).

When query task 140 determines that the block of cipher text is equivalent to the block of plain text 24, subprocess 102 proceeds to a task 144. Task 144 causes counter 84 (FIG. 1) of encryption activity monitor 34 to be incremented by a value of one, thus monitor 34 maintains a record of the number of blocks, or bits, of cipher text 26 that fail the encryption efficacy tests of task 138.

In response to task 144, a query task 146 determines if the counter record is less than a predetermined failure threshold 86. Predetermined failure threshold 86 is set according to the properties of the encryption algorithm being executed by algorithm processor 22 (FIG. 1). When query task 146 determines that the counter record is less than threshold 86, program control proceeds to task 142 and third enablement signal 42 (FIG. 1) is produced.

In response to task 142, a task 148 causes encryption activity monitor 34 to discard the tested blocks of cipher text 26 and plain text 24. Task 148 is performed to prevent plain text 24 from being inadvertently output by encryption system 20. Accordingly, plain text 24 desirably does not propagate beyond this point in monitor processor 28 (FIG. 1), and no block of plain text 24 is present at monitor processor 28 for long.

Following task 148, a query task 150 causes encryption activity monitor 34 to determine if more plain text 24 and cipher text 26 is detected. When more plain text 24 and cipher text 26 is detected, program control loops back to task 134 and encryption efficacy tests are performed for a subsequent block of cipher text 26. While subprocess 102 is in this loop, third enablement signal 42 is output by encryption activity monitor 34.

When encryption activity monitor 34 determines that there is not another block of cipher text 26 and corresponding plain text 24 in query task 150, program control proceeds to a task 152. Likewise, when encryption activity monitor 34 determines that the counter record is greater than predetermined failure threshold 86 (FIG. 1) in query task 146, program control proceeds to task 152.

Task 152 ascertains that the efficacy of the encryption algorithm executed in encryption processor 22 (FIG. 1) is unconfirmed. In other words, too many blocks of cipher text 26 are failing the encryption efficacy tests performed in task 138 by test circuit 74 (FIG. 1) of encryption activity monitor 34. Alternatively, encryption activities are complete and there are no further blocks of cipher text 26 to be tested. In either instance, task 152 causes accumulator 32 to prevent output of third enablement signal 42 (FIG. 1), and encryption system 20 exits subprocess 102 with third enablement signal 42 disabled.

With reference back to encryption process 87 (FIG. 2), conversion sequence confirmation subprocess 100, bit count subprocess 101, and encryption activity subprocess 102 are background processes that are occurring in parallel with conversion subprocess 90 to verify the proper execution of the selected one of encryption algorithms 45. As long as each of subprocesses 100, 101, and 102 are not exited by preventing the output of any of first, second, and third enablement signals 38, 40, and 42, respectively, a task 154 is performed.

Task 154 is performed following a completed conversion cycle in conversion subprocess 90, and causes monitor gate 36 (FIG. 1) to receive first, second, and third enablement signals 38, 40, and 42, respectively. In other words, first, second, and third enablement signals 38, 40, and 42 are received by monitor gate 36 in response to the proper execution of the selected one of encryption algorithms 45 encrypting plain text 24 in encryption processor 22 (FIG. 1).

Following receipt of each of first, second, and third enablement signals 38, 40, and 42, respectively, at monitor gate 36, encryption process 87 proceeds to a task 156. Task 156 causes monitor gate 36 to pass cipher text 26 out of encryption system 20. In response to task 156, process 87 loops back to conversion subprocess 90 to continue the conversion of plain text 24 to cipher text 26 for another conversion cycle.

When any one of subprocesses 100, 101, and 102 are exited, thus preventing the output of any one of first, second, and third enablement signals 38, 40, and 42, respectively, tasks 154 and 156 are not performed as a consequence of conversion subprocess 90. Rather, a task 158 is performed as a consequence of any one of subprocesses 100, 101, and 102. Task 158 detects when any of subprocesses 100, 101, and 102 were exited with their respective enablement signals 38, 40, and 42 disabled, and causes monitor gate 36 to stop the flow of cipher text 26 from encryption system 20 so that communications between the sender and the recipient are interrupted. In addition to the cessation of cipher text 26 from encryption system 20, task 158 may cause encryption system 20 to produce a conventional signal pattern or message indicating the termination of the communication.

In the preferred embodiment of the present invention, all of subprocesses 100, 101, and 102 are performed to provide a high level of assurance that the plain text is being properly encrypted in conversion subprocess 90. However, those skilled in the art will recognize that less than all three of subprocesses 100, 101, and 102 may be performed, yet still achieve a high level of assurance of the proper execution of the encryption algorithm. For example, a conversion sequence subprocess 100 and encryption activity subprocess 102 function independently of each other, and may be operated in the absence of bit count subprocess 101 to provide assurance of successful encryption.

In summary, a system and a method are provided for encrypting plain text to produce cipher text. The independent subprocesses performed by the monitor processor provide a high level of assurance that the software encryption algorithm is being properly executed. The monitor subprocesses verify that a selected encryption algorithm is executing the correct states in the correct order, that the encryption algorithm is operating in real time, and that the plain text is actually being encrypted. In addition, a software based system and a method are provided so that the encryption system can be implemented in any security product, such as commercial portable cellular handsets where size, power, or bill-of-material constraints make it difficult to implement encryption techniques using custom hardware. Furthermore, the state monitor, the accumulator, and the encryption activity monitor may be implemented in either software or in a commercially available programmable gate array thus eliminating the need for custom designed hardware.

Although the preferred embodiments of the invention have been illustrated and described in detail, it will be readily apparent to those skilled in the art that various modifications may be made therein without departing from the spirit of the invention or from the scope of the appended claims. For example, the modularity of the state monitor, the accumulator, and the encryption activity monitor allows one or more of these elements to be removed if specific implementation requirements do not require these verification tests.

What is claimed is:

1. A system for encrypting plain text to produce cipher text, said system comprising:
    a processor for receiving said plain text, said processor operating an encryption algorithm to convert said plain text to said cipher text;
    a state monitor in communication with said processor and configured to confirm a conversion sequence within each of a plurality of conversion cycles performed by said encryption algorithm, said state monitor producing a first enablement signal when said conversion sequence is confirmed;
    an encryption activity monitor in communication with said processor and configured to determine a number of blocks of said cipher text that are not encrypted, said encryption activity monitor producing a second enablement signal when said number of unencrypted blocks of said cipher text is less than a predetermined threshold; and
    a monitor gate coupled to said processor and configured to enable output of said cipher text in response to said first and second enablement signals.

2. A system as claimed in claim 1 wherein said monitor gate is configured to prevent the output of said cipher text in response to the absence of at least one of said first and second enablement signals.

3. A system as claimed in claim 1 wherein said state monitor includes:
    an input coupled to said processor for receiving state vectors from said processor, said state vectors including a first state vector and a second state vector;
    a comparator configured to compare said received first and second state vectors with predetermined first and second state vectors that describe a predetermined conversion sequence; and
    an output in communication with said comparator and configured to produce said first enablement signal when said received first and second state vectors of said conversion sequence coincide with said predetermined first and second state vectors of said predetermined conversion sequence.

4. A system as claimed in claim 1 wherein said encryption activity monitor comprises:
    a test circuit having a first input for receiving blocks of said plain text and a second input for receiving blocks of said cipher text, said test circuit being configured to identify ones of said received cipher text blocks that are equivalent to ones of said received plain text blocks; and
    a counter coupled to said test circuit and configured to count said identified ones of said cipher text blocks, said counter being configured to provide said second enablement signal when said count is less than said predetermined threshold.

5. A system as claimed in claim 1 further comprising an accumulator circuit in communication with said processor and said state monitor, said accumulator circuit being configured to produce a third enablement signal in response to substantially real time conversion of said plain text to said cipher text, wherein said monitor gate is configured to enable output of said cipher text in response to said third enablement signal.

6. A system as claimed in claim 5 wherein said accumulator circuit comprises:
    a memory element having an output, said memory element being configured to store a bit count, said bit count being a number of bits to be generated during one of said conversion cycles of said encryption algorithm;
    a first input coupled to said state monitor for receiving a conversion cycle-end signal from said state monitor;
    a second input coupled to said processor for receiving cipher text timing marks at each instance of conversion of a bit of said plain text to said cipher text by said processor;
    a summing circuit coupled to said first and second inputs and to said memory element output, said summing circuit having a bit balance, and said summing circuit being configured to add said bit count to said bit balance following receipt of said conversion cycle-end signal and decrement said bit balance following receipt of each of said cipher text timing marks; and
    a comparator having an input coupled to said summing circuit and having an output, said comparator being configured to compare said bit balance to a bit threshold, said output producing said third enablement signal when said bit balance is greater than said bit threshold.

7. A system as claimed in claim 6 wherein a maximum bit threshold is greater than said bit threshold, and said comparator is further configured to compare said bit balance to said maximum bit threshold, said comparator output producing said third enablement signal when said bit balance is less than said maximum bit threshold.

8. A system as claimed in claim 5 wherein said monitor gate is configured to prevent output of said cipher text in the absence of a least one of said first, second, and third enablement signals.

9. A system as claimed in claim 1 wherein said state monitor and said encryption activity monitor are software algorithms implemented in said processor.

10. A system as claimed in claim 1 wherein said system further comprises:
    a first memory element in association with said processor and configured to initialize said processor in response to a selected one of said encryption algorithm and a second encryption algorithm; and
    a second memory element in association with said state and encryption activity monitors and configured to initialize said state and encryption activity monitors independent of said processor initialization in response to said selected one of said encryption algorithms.

11. A method for encrypting plain text to produce cipher text, said method comprising the steps of:
    converting said plain text to said cipher text, said converting step being performed by an encryption algorithm;
    confirming a conversion sequence within each of a plurality of a conversion cycles performed by said encryption algorithm;
    determining a number of blocks of said cipher text that are not encrypted; and enabling output of said cipher text in response to said confirming step and when said number of unencrypted blocks of said cipher text is less than a predetermined threshold.

12. A method as claimed in claim 11 further comprising the steps of:
   producing a first enablement signal in response to said confirming step;
   producing a second enablement signal in response to said determining step; and
   preventing output of said cipher text in response to the absence of at least one of said first and second enablement signals.

13. A method as claimed in claim 11 wherein said confirming step comprises the steps of:
   providing state vectors which define said conversion sequence, said state vectors including a first state vector and a second state vector;
   comparing said first and second state vectors of said conversion sequence with predetermined first and second state vectors of a predetermined conversion sequence; and
   producing an enablement signal when said first and second state vectors of said conversion sequence coincide with said predetermined first and second state vectors of said predetermined conversion sequence.

14. A method as claimed in claim 11 wherein said determining step comprises the steps of:
   receiving blocks of said plain text;
   receiving blocks of said cipher text;
   identifying ones of said cipher text blocks that are equivalent to said plain text blocks; and
   incrementing a counter in response to said identified ones of said cipher text blocks to determine said number of unencrypted blocks.

15. A method as claimed in claim 14 further comprising the step of discarding said plain text blocks following said identifying step.

16. A method as claimed in claim 11 further comprising the steps of:
   receiving a conversion cycle-end signal at the end of each of said conversion cycles, said conversion cycle-end signal indicating a completion of each of said conversion cycles;
   accumulating a bit count in response to said conversion cycle-end signal, said bit count being the number of bits generated during one of said conversion cycles of said encryption algorithm; and
   decrementing said bit count in response to the conversion of plain text bits of said plain text to said cipher text by said encryption algorithm during subsequent conversion cycles.

17. A method as claimed in claim 16 further comprising the steps of:
   producing a first enablement signal in response to said confirming step;
   producing a second enablement signal in response to said determining step;
   producing a third enablement signal when said bit count is greater than a bit threshold; and
   preventing output of said cipher text in response to the absence of at least one of said first, second, and third enablement signals.

18. A method as claimed in claim 11 wherein said converting step is performed by a processor, said confirming step is performed by a state monitor, said determining step is performed by an encryption activity monitor, and said method comprises the steps of:
   selecting said encryption algorithm;
   initializing said processor in response to said selecting step using a first setup routine; and
   initializing said state and encryption activity monitors in response to said selecting step using a second setup routine, said first and second setup routines operating independently from one another, and said initializing steps occurring prior to said converting step.

19. A method as claimed in claim 18 wherein said encryption algorithm is a first encryption algorithm, and said method further comprises the steps of:
   selecting a second encryption algorithm;
   initializing said processor in response to said selected second encryption algorithm; and
   initializing said state and encryption activity monitors in response to said selected second encryption algorithm.

20. A method for encrypting plain text to produce cipher text, said method comprising the steps of:
   converting said plain text to said cipher text, said converting step being performed by an encryption algorithm;
   confirming a conversion sequence within each of a plurality of a conversion cycles performed by said encryption algorithm;
   receiving a conversion cycle-end signal following each of said conversion cycles, said conversion cycle-end signal indicating a completion of each of said conversion cycles;
   accumulating a bit count in response to said conversion cycle-end signal, said bit count being the number of bits generated during one of said conversion cycles of said encryption algorithm;
   decrementing said bit count in response to a conversion of plain text bits of said plain text to said cipher text by said encryption algorithm during subsequent conversion cycles;
   enabling output of said cipher text in response to said confirming step and when said bit count is greater than a bit threshold
   producing a first enablement signal in response to said confirming step;
   producing a second enablement signal when said bit count is greater than a bit threshold; and
   preventing output of said cipher text in the absence of at least one of said first and second enablement signals.

* * * * *